J. F. AGEE.
COMBINED COTTON CHOPPER AND CULTIVATOR.
APPLICATION FILED NOV. 14, 1906.
904,038.
Patented Nov. 17, 1908.
2 SHEETS—SHEET 1.
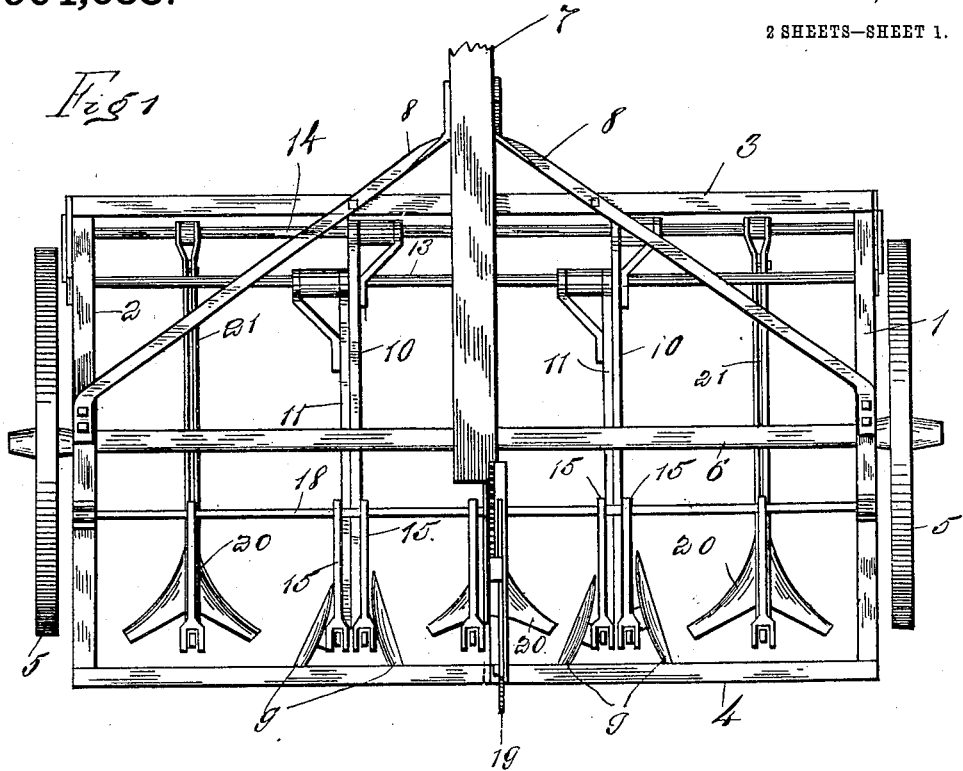
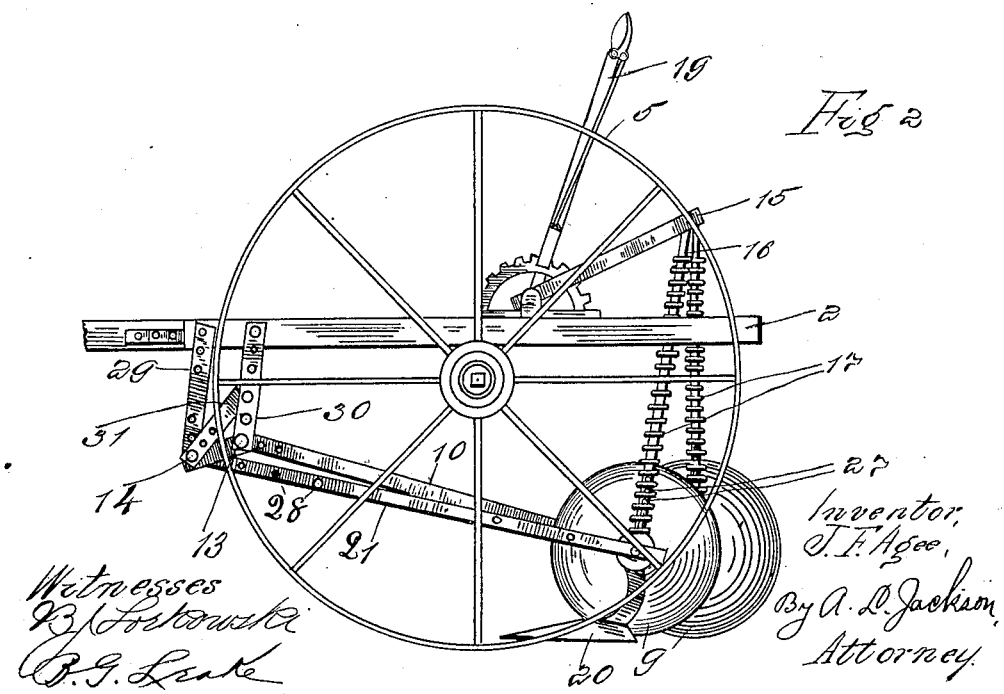

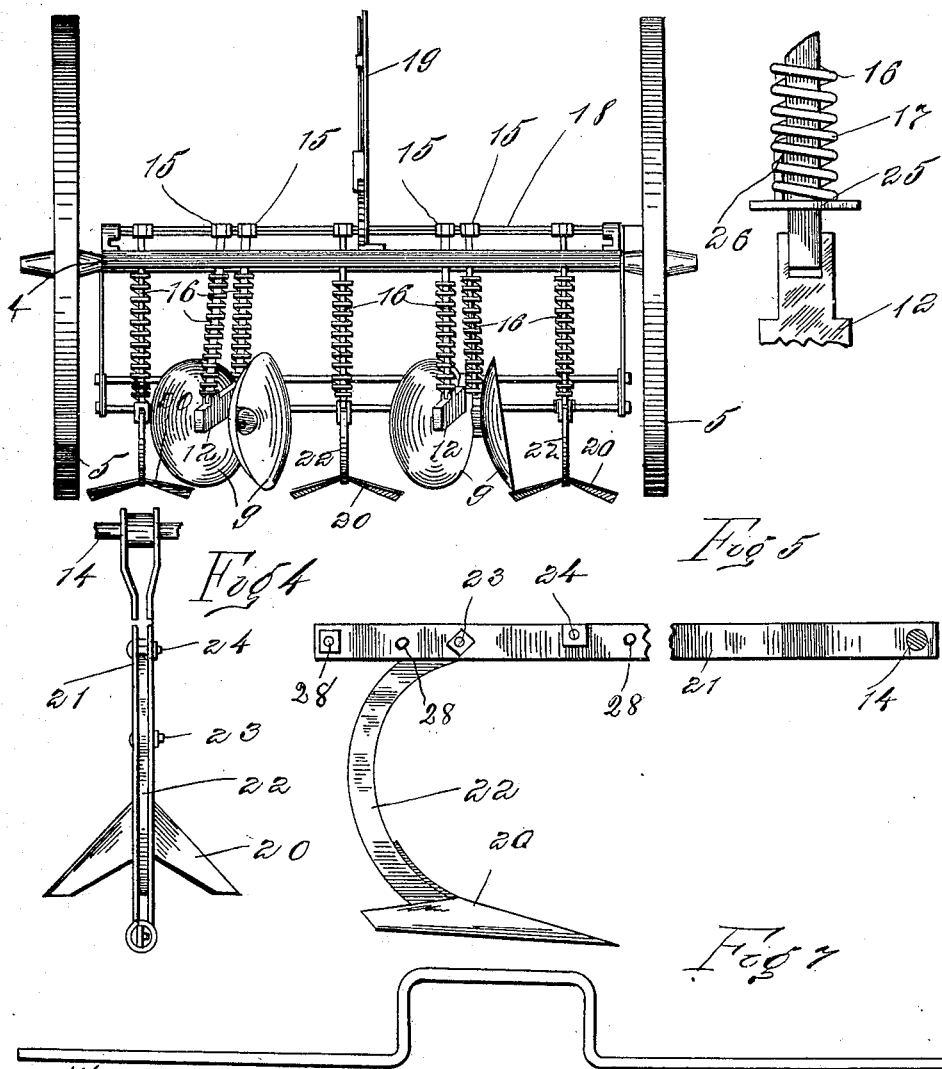

UNITED STATES PATENT OFFICE.

JONATHAN F. AGEE, OF QUANAH, TEXAS.

COMBINED COTTON CHOPPER AND CULTIVATOR.

No. 904,038.　　　Specification of Letters Patent.　　　Patented Nov. 17, 1908.

Application filed November 14, 1906. Serial No. 343,365.

*To all whom it may concern:*

Be it known that I, JONATHAN F. AGEE, a citizen of the United States, residing at Quanah, county of Hardeman, and State of Texas, have invented certain new and useful Improvements in a Combined Cotton Chopper and Cultivator, of which the following is a specification.

My invention relates to certain improvements in the cotton chopper shown in the patent issued to me on Nov. 21, 1905, No. 805,110, and the object is to add small sweeps or cultivators to the cotton chopper and also to make the machine readily convertible into a cultivator for general purposes. The agricultural implement has been thoroughly demonstrated and found to be entirely satisfactory.

One of the advantages of this invention is that it is a wheeled instrument and one man with a team of horses can do about as much work as ten men with the usual hoes.

Another advantage is that the cotton can be chopped so much earlier with the machine. The cotton can be chopped while very young and small and before grass can get strong enough to injure the cotton when being removed. The cotton can be put in condition for early plowing. The machine is driven across the cotton rows and the cotton is thus checked so that it may be plowed in both directions, that is longitudinally with the rows or transversely. The small sweeps, which are added to the machine formerly patented, plow up the grass and break the ground between the tracks made by the disks. The grass is thus plowed up and then covered up by the disks.

Other objects and advantages will be fully explained in the following description and the invention will be more particularly pointed out in the claims.

Reference is had to the accompanying drawings which form a part of this application and specification.

Figure 1 is a plan view of the cotton chopper and cultivator without the seat. Fig. 2 is a side elevation of the same. Fig. 3 is a rear elevation of the same. Fig. 4 is a plan view of one of the plows and the means for adjusting the plow and attaching the same to the frame. Fig. 5 is a side elevation of the same. Fig. 6 is a broken detail view, illustrating the springs for controlling the pressure which is to be applied to the revolving disks and plows. Fig. 7 illustrates a variation in the shaft to be used when the machine is used as a cultivator.

Similar characters of reference are used to indicate the same parts throughout the several views.

This invention is provided with a wheeled truck composed of the frame having side pieces 1 and 2, front beam 3 and rear beam 4, wheels 5, and axle 6. The truck is also provided with a tongue 7 with hounds 8 attached to the frame of the truck. These hounds serve as braces for the truck. The disks 9 are the same as the disks shown in my patent above cited. The beams 10 and 11, the castings 12, the shafts 13 and 14, the presser arms 15, and the adjusting bars 16 with the springs 17 are the same in construction and arrangement as these parts are in the above noted patent. The shaft 18 and lever 19 are also the same in construction and operation as in said patent, the shaft 18 being square in cross-section so that the lever 19 may be used to regulate the height of the presser arms 15. The disks 9 do the chopping or thinning of the cotton, leaving the cotton plants which are to be cultivated standing in the space which is left between each pair of disks. Something is needed to plow up the weeds and grass and loosen the ground between the outside disk of one pair and the outside disk of the next pair of disks so that the disks will cover up such weeds and grass. For this purpose I have provided small sweeps, or what are generally called shovels, for breaking the ground between each pair of disks. These small sweeps 20 are mounted on beams 21 which beams are composed of two parallel bars. The beams 21 are pivotally connected to the shaft 14 and the shank 22 of the sweep 20 operates between the bars of beam 21. A pivot bolt 23 connects the sweep to the beam 21 and the shank presses upwards against a bolt 24. The object of this construction is to permit the sweep to swing backwards under the truck when the sweep strikes a rock or other obstruction and thus to prevent the breaking of the sweep. Under all ordinary resistances the sweeps will be held in place by the bolts 24 which will hold the sweeps in the ground at the required depths. The depths at which the sweeps are to run can be regulated by the lever 19, shaft 18, and the presser arms 16 with the springs 17, the tension,—and consequently the pressure of the arms 16, can be regulated by adjusting plates or spring seats 25 at different heights on the arms 16. For this purpose a hook 26 is struck from the plate 25 and may be inserted in different holes 27 through the arms 16. The sweeps are adjustable forwards or backwards as may be desired by means of the different holes 28 in the beams 21. The shafts 13 and 14 are adjustable to different heights by reason of pluralities of holes in the hangers 29, 30, and 31. The beams 10 and 11 have pluralities of holes for forward or backward adjustments.

Any suitable number of pairs of disks may be used on the cotton chopper herein described. There must be a sweep between each pair of disks and a sweep on the outside of the outside pair of disks. For three pairs of disks there would have to be four sweeps. For four pairs of disks there would have to be five sweeps.

The agricultural implement herein described may be converted into a light wheeled cultivator by taking off the disks and putting sweeps or plows on instead of the disks. The beams are laterally adjustable on the shafts 13 and 14. When the machine is to be used for a cultivator, it may be advisable to substitute such shafts as are shown in Fig. 7 for shafts 13 and 14 so that the arched part of the shaft will pass over the tops of the plants.

Having fully described my invention what I claim is new and desire to secure by Letters Patent, is,—

1. A combined cotton chopper and cultivator comprising a wheeled truck, transverse shafts mounted in said truck, pairs of disks provided with beams engaging said shafts, said disks forming means for thinning the cotton, shovels coöperating with the said disks to loosen the part of the ground not plowed by the disks and being in advance of said disks, beams for said shovels engaging one of said transverse shafts, each beam for said shovels being composed of two parallel bars, a shank carrying each shovel and projecting up between the bars of said beam, a pivot bolt securing said shank between said bars, and a bolt holding the forward end of said shank down.

2. A combined cotton chopper and cultivator comprising a wheeled truck, transverse shafts, hangers for vertical adjustment of said shafts and for attaching said shafts to said truck, pairs of disks provided with beams engaging said shafts, said disks forming the means for chopping the cotton, shovels coöperating with said disks to loosen the ground in advance of said disks, a shovel being arranged between each pair of disks and on the outside of each pair of disks, beams attached to one of said shafts, shanks adjustably and pivotally connected to said beams, and bolts engaging the forward parts of said shanks and passing through said beams and serving to hold said shovels in the ground.

In testimony whereof, I set my hand in the presence of two witnesses, this 11th day of December, 1907.

JONATHAN F. AGEE.

Witnesses:
  J. E. WILEY,
  DUFFIE REID.